(12) United States Patent
Kershaw et al.

(10) Patent No.: US 11,040,715 B2
(45) Date of Patent: Jun. 22, 2021

(54) ACTIVITY MONITOR

(71) Applicant: JAGUAR LAND ROVER LIMITED, Coventry (GB)

(72) Inventors: Charlotte Kershaw, Warwickshire (GB); Christopher Wild, Warwickshire (GB); Christophe Fava-Rivi, Warwickshire (GB); Francois Loubaresse, Warwickshire (GB); Miguel Lopez, Warwickshire (GB); Mark Grant, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 114 days.

(21) Appl. No.: 16/311,534

(22) PCT Filed: Jun. 13, 2017

(86) PCT No.: PCT/EP2017/064378
§ 371 (c)(1),
(2) Date: Dec. 19, 2018

(87) PCT Pub. No.: WO2017/220375
PCT Pub. Date: Dec. 28, 2017

(65) Prior Publication Data
US 2019/0232959 A1    Aug. 1, 2019

(30) Foreign Application Priority Data

Jun. 20, 2016   (GB) ..................................... 1610725

(51) Int. Cl.
*B60W 30/14* (2006.01)
*G06F 11/07* (2006.01)
(Continued)

(52) U.S. Cl.
CPC .......... *B60W 30/143* (2013.01); *B60W 10/08* (2013.01); *G06F 11/0739* (2013.01); *G06F 11/0751* (2013.01); *G06F 11/3013* (2013.01)

(58) Field of Classification Search
USPC ............................................... 701/93
See application file for complete search history.

(56) References Cited

U.S. PATENT DOCUMENTS 5,072,391 A * 12/1991 Abe ..................... G01R 31/007
340/439
2005/0038530 A1    2/2005 Nagasaka et al.
(Continued)

FOREIGN PATENT DOCUMENTS

EP            1117033 A      7/2001
WO        2010007469 A1     1/2010

OTHER PUBLICATIONS

Search and Examination Report, GB1610725.6, 8 pp.
International Search Report and Written Opinion, PCT/EP2017/064378, 20 pp.

*Primary Examiner* — Tyler D Paige
(74) *Attorney, Agent, or Firm* — McCoy Russell LLP

(57) ABSTRACT

An activity monitor for a modular software system, the system having a first software component for use in configuring operation of a second software component via a proxy and stub interface, the activity monitor comprising; an input arranged to monitor a first event associated with the first software component and a second event associated with the proxy; a processor arranged to compare the first and second events to a schedule of events to assess compliance with the schedule of events; and an output arranged to generate an error message in response to non-compliance with the schedule of events, the error message being for use in treating the error. A method of generating an activity monitor for monitoring operation of a modular software system.

17 Claims, 4 Drawing Sheets

(51) Int. Cl.
B60W 10/08 (2006.01)
G06F 11/30 (2006.01)

(56) References Cited

U.S. PATENT DOCUMENTS

| | | | |
|---|---|---|---|
| 2005/0038581 A1* | 2/2005 | Kapolka | G07C 5/008 |
| | | | 701/31.4 |
| 2005/0076266 A1* | 4/2005 | Costin | G06F 11/26 |
| | | | 714/38.13 |
| 2005/0203817 A1 | 9/2005 | Abo-Hasna et al. | |
| 2010/0291920 A1 | 11/2010 | Lerzer et al. | |
| 2010/0318259 A1* | 12/2010 | Chinnadurai | G06F 9/545 |
| | | | 701/31.4 |
| 2014/0244122 A1 | 8/2014 | Inakura et al. | |
| 2014/0325287 A1* | 10/2014 | Nair | G06F 11/0757 |
| | | | 714/47.1 |
| 2015/0100953 A1* | 4/2015 | Yim | G06F 8/65 |
| | | | 717/170 |
| 2015/0268133 A1 | 9/2015 | Ranjan et al. | |
| 2016/0011932 A1 | 1/2016 | Abo El-Fotouh | |
| 2016/0306960 A1* | 10/2016 | Gajulapalli | G06F 21/44 |
| 2016/0328272 A1* | 11/2016 | Ahmed | G06F 9/4881 |
| 2016/0358477 A1* | 12/2016 | Ansari | G06Q 30/0251 |
| 2019/0031203 A1* | 1/2019 | Fox | G06F 8/71 |
| 2019/0232959 A1* | 8/2019 | Kershaw | G06F 11/3013 |
| 2019/0258251 A1* | 8/2019 | Ditty | G06K 9/00805 |

* cited by examiner

ACTIVITY MONITOR

CROSS-REFERENCE TO RELATED APPLICATIONS

This application is a 371 of International Application No. PCT/EP2017/064378, filed Jun. 13, 2017, which claims priority to GB Patent Application No. 1610725.2, filed Jun. 20, 2016, the contents of both of which are incorporated by reference herein in their entirety.

TECHNICAL FIELD

The present disclosure relates to an activity monitor for a modular software system and particularly, but not exclusively, to an activity monitor for a vehicle system, for example a cruise control system of a vehicle. Aspects of the invention relate to an activity monitor for monitoring a modular software system, a system, a vehicle, a method of monitoring activity in a software component system, and a method of generating an activity monitor.

BACKGROUND

Various systems in vehicles or other such machines are typically controlled using software systems. An example of such a system is a cruise control system. Such a system is typically controlled using a software system constructed from common off-the-shelf (COTS) software components.

Typically, in a cruise control system, there would be a logic component and a drivetrain component. The drivetrain component would be controlled by the logic component based on various inputs, such as a user input or a sensor input.

It is often beneficial to segregate these software components on separate memory spaces so as to increase system robustness against faults. In doing so, a proxy and stub interface can be employed to marshal commands sent between two software components. Although segregating these software components offers a degree of system robustness, additional measures are desirable to further improve robustness.

It is an object of embodiments of the present invention to address disadvantages associated with the prior art.

SUMMARY OF THE INVENTION

Aspects and embodiments of the invention provide an activity monitor for monitoring a modular software system, a system, a vehicle, a method of monitoring activity in a software component system, and a method of generating an activity monitor as claimed in the appended claims.

According to an aspect of the invention, there is provided an activity monitor for a modular software system, the system having a first software component for use in configuring operation of a second software component via a proxy and stub interface, the activity monitor comprising;

an input arranged to monitor a first event associated with the first software component and a second event associated with the proxy;

a processor arranged to compare the first and second events to a schedule of events to assess compliance with the schedule of events; and an output arranged to generate an error message in response to non-compliance with the schedule of events, the error message being for use in treating the error.

In an embodiment, the schedule of events includes timing and/or order of the events.

The first software components may be stored on a first memory space and the second software component may be stored on a second memory space.

According to another aspect of the invention, there is provided a system comprising a first software component and a second software component, the first software component for use in configuring operation of the second software component, the system comprising a proxy and stub interface for routing events to the second software component and the system comprising the activity monitor as hereinbefore described.

The system may be a vehicle system. In an embodiment, the vehicle system is a cruise control system.

The second software component may comprise a drivetrain component.

In an embodiment, the first software component comprises a logic component arranged to generate a command event to control the second software component based on an input event. The input event may comprise a sensor reading obtained from a sensor component. Optionally, the input event comprises a sensor reading from a sensor software component. The sensor component may be a speed sensor component.

In an embodiment, the input event is obtained in response to a polling event initiated by the logic component.

In another embodiment, the event associated with the first software component is selected from a list including the input event, the polling event, and the command event.

In a further embodiment, the system comprises a troubleshooting component arranged to treat the error in response to receiving the error message.

According to further aspect of the invention, there is provided a vehicle comprising the system as described above.

According to a still further aspect of the invention, there is provided a method of monitoring activity in a modular software system, the system having a first software component for use in configuring operation of a second software component via a proxy and stub interface, the method comprising;

monitoring a first event associated with the first software component and a second event associated with the proxy;

comparing the first and second events to a schedule of events to assess compliance with the schedule of events; and generating an error message in response to non-compliance with the schedule of events, the error message being for use in treating the error.

According to another aspect of the invention, there is provided a method of generating an activity monitor for monitoring operation of a modular software system, the method comprising;

reading an activity specification;

determining a schedule of events based on the specification using a code generator; and generating the activity monitor including the schedule of events, an input for monitoring events associated with a first software component for comparison with the schedule of events, and an output for outputting an error message in response to one of the events being non-compliant with the schedule.

According to another aspect of the present invention, there is provided a computer storage medium comprising computer-readable instructions for a computer to carry out one or more of the methods as described above.

According to yet another aspect of the invention, there is provided a non-transitory computer-readable storage medium storing executable computer program instructions to implement one or more of the methods as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

An activity monitor in accordance with embodiments of the present invention is described below in the context of a cruise control system. However, it is to be appreciated by the skilled person that activity monitors in accordance with embodiments of the present invention may be used in other software controlled systems applied to both vehicle system applications and non-vehicle system environments. Without limitation, activity monitors in accordance with embodiments of the present invention may be applied to safety critical systems in vehicle system applications and non-vehicle system environments.

Figure 1:
FIG. 1 shows a vehicle embodying a system according to an aspect of the present invention.

With reference to FIG. 1, a vehicle 10 includes a body 12 mounted on, and driven by, four wheels 14. Although not shown in FIG. 1 due to being obscured by the body 12, the vehicle 10 also includes a system 16 (as shown in FIG. 2) embodied as a cruise control system in this embodiment.

Figure 2:
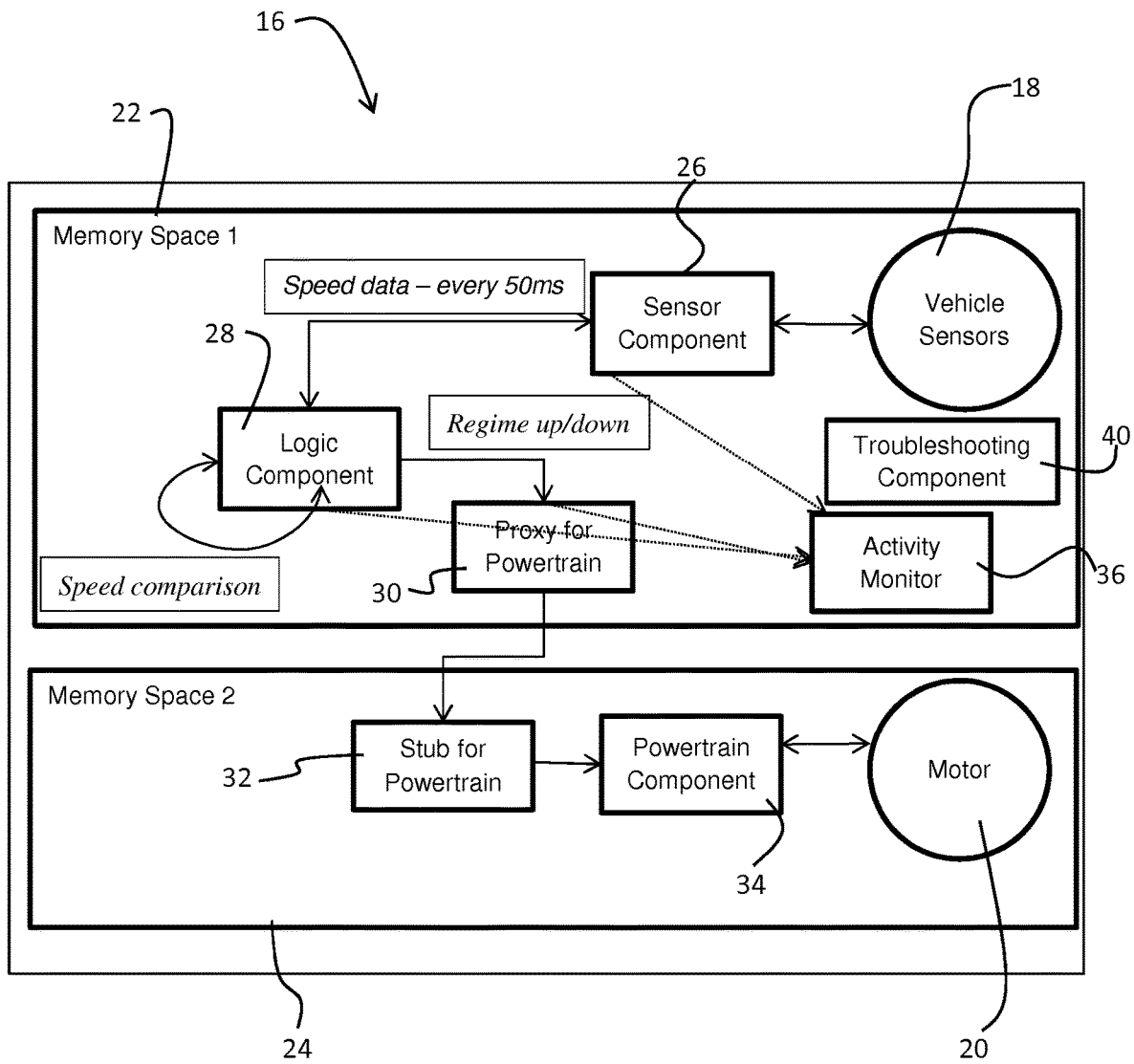
FIG. 2 shows a block diagram of the system from the vehicle of FIG. 1.

With reference to FIG. 2, the cruise control system 16 is shown in the form of a block diagram for illustrative purposes. The cruise control system 16 includes hardware in the form of a vehicle sensor 18, a motor 20, and a vehicle computer (not shown).

The vehicle sensor is a speed sensor 18, which may take various forms, though for illustrative purposes, the speed sensor 18 in this embodiment is a wheel speed sensor. In particular the speed sensor 18 is a tachometer, which works by counting the revolution speed of a side shaft associated with one of the wheels 14 (FIG. 1).

The motor 20 is provided in the form of an internal combustion engine. The motor 20 is located under a bonnet of the body 12 (FIG. 1) and has an output shaft arranged to transfer torque to the wheels via a drivetrain. An output torque from the engine is controlled by an engine control unit (not shown).

The computer includes a processor and a data store, in the form of a non-transitory memory component. The data store is partitioned into two memory spaces; a first memory space 22 and a second memory space 24. However, in other embodiments, two separate data stores may each be used as an independent memory space. Regardless as to the physical architecture of the data store, each memory space is arranged to store electronic data for processing by the processor.

In this embodiment, the electronic data stored on the memory spaces 22, 24, is in the form of a plurality of software components. The software components are categorised as commercial off-the-shelf (COTS) components or derived components.

As shown in FIG. 2, the cruise control system 16 comprises a COTS sensor component 26, logic component 28 and powertrain component 34. Also shown in FIG. 2 is a proxy software component 30, a stub software component 32 and an activity monitor 36 as described in more detail below and also in accordance with embodiments of the present invention.

The proxy 30 and stub 32 represent intermediary software for the powertrain component 34 and the logic component 28 is arranged to interact with the powertrain component 34 through the proxy 30 and stub 32.

In terms of their locality within the data store, the logic component 28 is situated on the first memory space 22 and the powertrain component 34 is situated on the second memory space 24. Such separation is important to improve system robustness against faults since the logic component 28 is arranged to control operation of the powertrain component 34.

The other components located on the first memory space 22 include the sensor component 26, the proxy 30, and the activity monitor 36. The other software components, namely the stub 32 and the powertrain component 34 are located on the second memory space 24.

The proxy 30 is a software component which provides the same functional interface as a given component (in this embodiment, the powertrain component 34) but which is wholly concerned with managing the distribution and routing of the interaction requests to the appropriate point in the system where the required service resides. The stub 32 is another software component which accepts communication from a proxy for a service and transmits the request to the actual service (in this embodiment, the powertrain component 34).

The sensor component 26 acts as an interface with the speed sensor 18 to convert the revolution speed to a vehicle speed using a look-up table created using geometry and environmental data associated with the vehicle. Two-way communication is provided between the sensor component 26 and the logic component 28. In this way, readings from the sensor component 26 can be provided independently to the logic component 28 or the logic component 28 can request speed readings from the sensor component 26 by initiating the flow of information from the logic component side.

In this embodiment, the logic component 28 is arranged to poll the sensor component 26 for speed readings periodically. Each poll, or request for a speed reading, can be envisaged as an event, or more specifically a polling event. The polling period in this embodiment is 50 ms, or at a frequency of 0.05 Hz. The logic component 28 also includes a target speed and compares the speed readings to the target speed. The target speed is set dictated by an input received either manually from a user interface panel or automatically from an ancillary navigation system, such as a global positioning system (GPS). In a similar way to the polling event, each comparison can be envisaged as an event, in this case a comparison event.

Based on the result of the comparison, the logic component 28 generates a command for an engine output torque. For instance, if the target speed is greater than the speed reading, then an increase in engine output torque is requested. However, for a target speed less than the speed reading, then a decrease or even a cessation of the engine output torque is requested. The command is sent to the proxy 30 and can be considered as a command event.

The proxy 30 is tasked with marshalling any command events received and routing them to their target location on another memory space. In this embodiment, the proxy 30 is used to route command events to the corresponding stub 32 on the secondary memory space 24. Upon receipt of the command, the stub 32 routes the command to the powertrain component 34. The powertrain component 34 in this embodiment is in the form of the engine control unit and so any torque demands received are used to configure the motor 20 to output the desired output torque.

The activity monitor 36 is a passive component in the system so the software components with which it interfaces remain unaware of its operation. The activity monitor 36 has an input for receiving data related to the monitoring of the aforementioned events. In particular, the activity monitor 36 monitors the comparison events from the logic component 28. In addition, the activity monitor 36 monitors the polling events when the logic component 28 polls the sensor component 26. Finally, the activity monitor 36 monitors the command events at the time of being input to the proxy 30.

The activity monitor 36 includes the input for receiving data related to the monitoring of events, as described above, and a processor. The processor includes a schedule of events, which schedule includes the timing and order associated with each of the three events referenced above. For instance, the polling event should be order 1 and a predetermined time period later, event 2 is identified in the form of the comparison event. Finally, event 3 is identified as the command event at a further predetermined time period following event 2.

Figure 3:
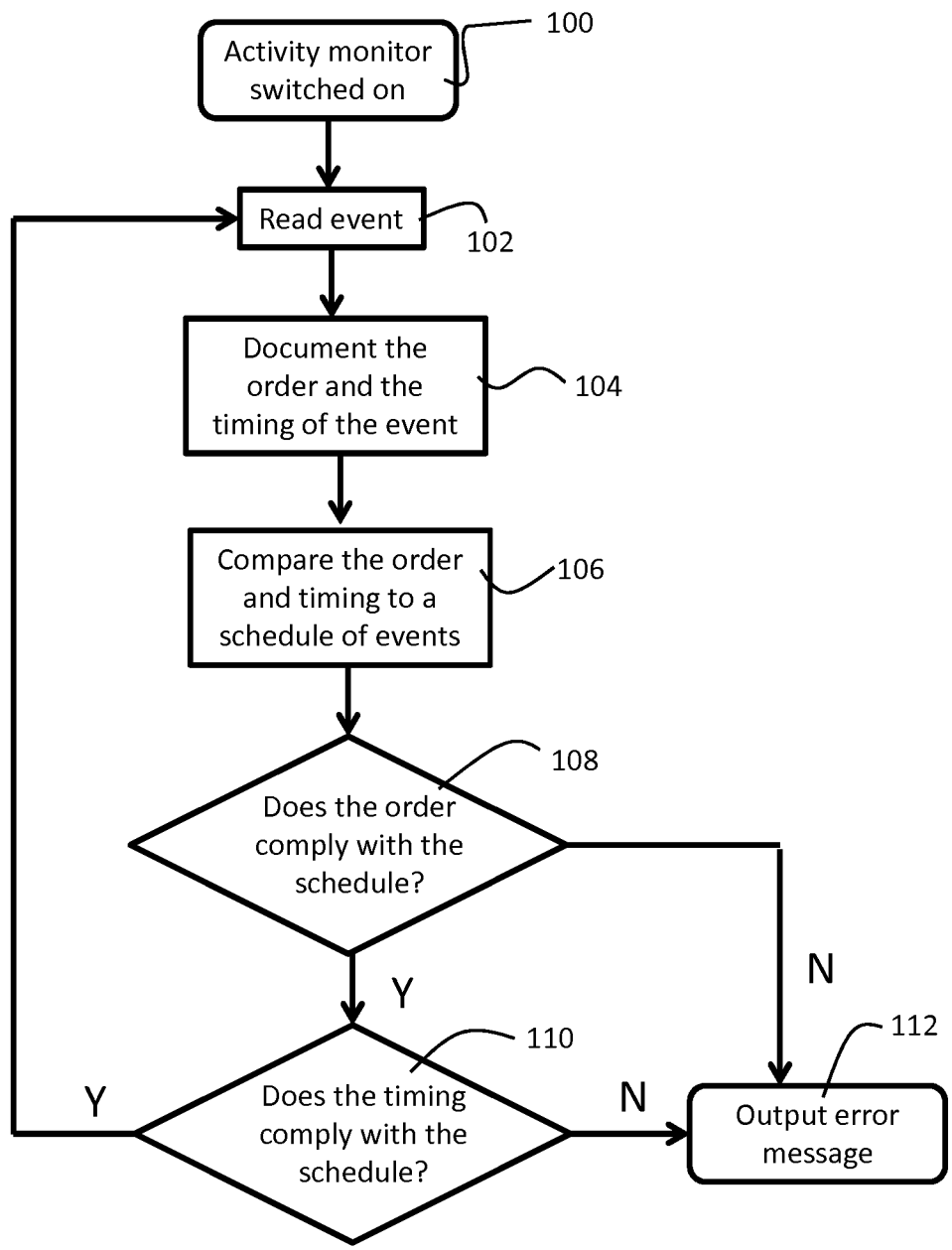
FIG. 3 is flow chart representing operation of the activity monitor from the system of FIG. 2.

With reference to FIG. 3, in operation, the activity monitor 36 is switched on at step 100 by manual user activation or automatically by the on-board vehicle computer. At step 102, the activity monitor reads, or monitors, the events, which events include the polling event, the comparison event and the command event. The read event is then documented at step 104 in terms of the timing of the event and the order at which the event has occurred. For instance, in normal operation, the polling event is the first event and so is documented as event 1. The comparison event occurs next and so is documented as event 2, and so forth. Step 106 compares the documented events for compliance with the schedule of events. Step 108 shows the operation of checking the order of the event for compliance with the schedule and step 110 shows the operation of checking the timing of the event for compliance with the schedule. However, in practice these may be performed in a single checking step when checking both the order and timing at once.

In normal operation, when the monitored events are in compliance with both the timing and order according to the schedule of events, the activity monitor 36 does not output anything and remains in an inactive and passive state. In this way, the activity monitor returns to step 102 to read the next event. However, if the timing and/or order of the monitored events is non-compliant with the schedule of events, the activity monitor 36 generates an output message, such as the error message as shown at step 112. An example of non-compliance could be where the polling event occurs after the comparison event, i.e. the polling event is identified as event 2 and the comparison event is identified as event 1, in which case the comparison is likely to have been performed on a previous speed reading, potentially as a result of an error in the system. In such a case, the error message can be used in treating the error.

There are various ways in which the error message can be used in treating the error. For instance, the system can include a troubleshooting component 40 (shown in FIG. 2). In use, the troubleshooting component has an order sequence of tests to be performed in response to any given error. Once the error has been diagnosed, the troubleshooting component can fix the error in the offending software component. Alternatively, the error message may be detectable by a diagnostic tool from a maintenance person, or displayed on a display panel in the vehicle to be addressed by the driver.

By monitoring the timing and order of events, the system integrity is improved since any error which could be responsible for erroneous timing and/or order can be investigated and potentially addressed.

Another aspect of the invention is how the activity monitor 36 (FIG. 2) is generated. One way to generate the activity monitor 36 would be to create the activity monitor as an add-on component to an existing COTS component. However, such a method of generating the activity monitor 36 would require coding updates as and when any modification is made to the various software components with which it interfaces. This is not efficient since these components are COTS components and so detailed knowledge of them would be required for such updates. Instead, the activity monitor is generated at system integration time using the COTS components as inputs.

Figure 4:
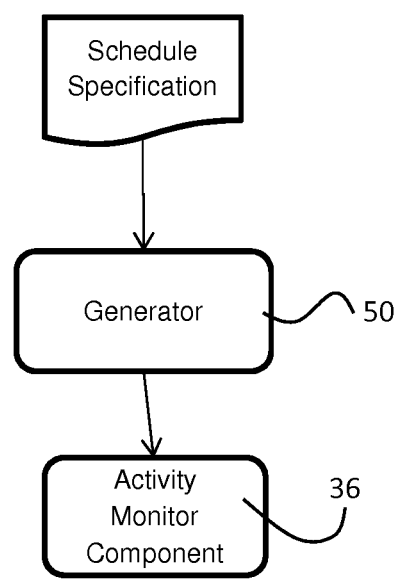
FIG. 4 shows a high level flow chart of method of generating an activity monitor from the system of FIG. 2.

With reference to FIG. 4, an events schedule of each of the COTS software components is used as an input. In particular, the events schedule includes code relating to the polling event and the comparison event in the logic component. In addition, code relating to the command event at entry to the proxy is also used as an input. A code generator 50 is used to generate a schedule of events based on these inputs. In addition, the code generator 50 writes the code for automatic creation of the activity monitor component 36 so as to include the schedule of events as well as the input and the output, for those reasons specified above.

Generating the activity monitor 36 in this way removes the burden on a development team or individual in producing the activity monitor 36 when a change to any of the other components is made.

It will be appreciated that various changes and modifications may be made to the apparatus and method described herein without departing from the scope of the present invention.

As used herein 'for' should be considered to also include 'configured or arranged to'. For example 'a system for' should be considered to also include 'a system configured or arranged to'.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An activity monitor for a modular software system, the system having a first software component for use in configuring operation of a second software component via a proxy and stub interface, the activity monitor comprising;
    an input arranged to monitor a first event associated with the first software component and a second event associated with the proxy;
    a processor arranged to compare the first and second events to a schedule of events to assess compliance with the schedule of events; and
    an output arranged to generate an error message in response to non-compliance with the schedule of events, the error message being for use in treating the error.

2. The activity monitor of claim 1 wherein the schedule of events includes either or both timing and order of the events.

3. The activity monitor of claim 1 wherein the first software component is stored on a first memory space and the second software component is stored on a second memory space.

4. A system comprising a first software component and a second software component, the first software component for use in configuring operation of the second software component, the system comprising a proxy and stub interface for routing events to the second software component and the system comprising the activity monitor of claim 1.

5. The system of claim 4 wherein the system is a vehicle system.

6. The system of claim 5 wherein the vehicle system is a cruise control system.

7. The system of claim 5 wherein the second software component comprises a drivetrain component.

8. The system of claim 4 wherein the first software component comprises a logic component arranged to generate a command event to control the second software component based on an input event.

9. The system of claim 8 wherein the input event comprises a sensor reading obtained from a sensor component.

10. The system of claim 9 wherein the sensor component is a speed sensor component.

11. The system of claim 9 wherein the input event is obtained in response to a polling event initiated by the logic component.

12. The system of claim 11 wherein the event associated with the first software component is selected from a list including the input event, the polling event, and the command event.

13. The system of claim 4 comprising a troubleshooting component arranged to treat the error in response to receiving the error message.

14. The system of claim 4 comprised in a vehicle.

15. A method of monitoring activity in a modular software system, the system having a first software component for use in configuring operation of a second software component via a proxy and stub interface, the method comprising;
    monitoring a first event associated with the first software component and a second event associated with the proxy;
    comparing the first and second events to a schedule of events to assess compliance with the schedule of events; and
    generating an error message in response to non-compliance with the schedule of events, the error message being for use in treating the error.

16. A method as claimed in claim 15 comprised of computer-readable instructions stored on a computer storage medium.

17. A method as claimed in claim 15 comprised of executable computer program instructions stored on a non-transitory computer-readable storage medium.

* * * * *